United States Patent
Koga et al.

(10) Patent No.: US 7,185,990 B2
(45) Date of Patent: Mar. 6, 2007

(54) PROJECTION DISPLAY APPARATUS (75) Inventors: Akira Koga, Osaka (JP); Takaaki Tanaka, Hirakata (JP); Takehiro Okada, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 21 days.

(21) Appl. No.: 10/537,979

(22) PCT Filed: Jun. 1, 2004

(86) PCT No.: PCT/JP2004/007897

§ 371 (c)(1),
(2), (4) Date: Jun. 8, 2005

(87) PCT Pub. No.: WO2005/026835

PCT Pub. Date: Mar. 24, 2005

(65) Prior Publication Data

US 2006/0050248 A1    Mar. 9, 2006

(30) Foreign Application Priority Data

Sep. 10, 2003 (JP) ............................. 2003-318016

(51) Int. Cl.
*G03B 21/14* (2006.01)
(52) U.S. Cl. ......................................... 353/97; 353/38
(58) Field of Classification Search .................. 353/38, 353/97; 349/5, 7, 8, 9; 362/283, 284, 321, 362/322, 323, 324; 359/233, 234, 236
See application file for complete search history.

(56) References Cited

U.S. PATENT DOCUMENTS 5,300,967 A * 4/1994 Kamon ........................ 353/97
5,924,783 A * 7/1999 Jones .......................... 353/97
6,755,538 B2 * 6/2004 Sugawara ..................... 353/97

(Continued)

FOREIGN PATENT DOCUMENTS

JP          49-063452          6/1974

(Continued)

OTHER PUBLICATIONS

International Search Report for PCT/JP2004/007897, dated Jun. 29, 2004.

*Primary Examiner*—William C. Dowling
(74) *Attorney, Agent, or Firm*—RatnerPrestia (57) ABSTRACT

A projection display apparatus for expanding and projecting an image, which is formed by an optical modulator, using a projection lens. A light source illuminates the optical modulator. A first lens array divides light emitted from the light source into a plurality of partial luminous fluxes. A second lens array superimposes the plurality of partial luminous fluxes emitted from the first lens array onto the optical modulator. A diaphragm mechanism is disposed between the light source and the optical modulator, and controls an amount of light from the light source. A traveling direction of the light emitted from the light source is defined as a Z-axis, a direction perpendicular to the Z-axis is defined as an X-axis, and a direction perpendicular to a plane formed by the Z-axis and the X-axis is defined as a Y-axis. An area of an opening of the diaphragm mechanism changes in a direction of the X-axis or the Y-axis.

12 Claims, 12 Drawing Sheets

U.S. PATENT DOCUMENTS

| | | | |
|---|---|---|---|
| 6,769,777 B1 * | 8/2004 | Dubin et al. | 353/97 |
| 6,854,851 B2 * | 2/2005 | Yamasaki et al. | 353/97 |
| 2002/0109992 A1 * | 8/2002 | Wang | 362/293 |

FOREIGN PATENT DOCUMENTS

| | | |
|---|---|---|
| JP | 50-083022 A | 7/1975 |
| JP | 57-070610 U | 4/1982 |
| JP | 02-019012 U | 2/1990 |
| JP | 2003-107396 A | 4/1993 |
| JP | 05-303085 | 11/1993 |
| JP | 11-067656 A | 3/1999 |
| JP | 11-194383 A | 7/1999 |
| JP | 2001-100699 | 4/2001 |
| JP | 2001-228569 A | 8/2001 |
| JP | 2002-090705 A | 3/2002 |
| JP | 2002-148555 A | 5/2002 |
| JP | 2003-029203 A | 1/2003 |
| JP | 2003-156711 A | 5/2003 |
| JP | 2003-241311 A | 8/2003 |

* cited by examiner

PROJECTION DISPLAY APPARATUS

This Application is a U.S. National Phase Application of PCT International Application PCT/JP2004/007897.

TECHNICAL FIELD

The present invention relates to a projection display apparatus which is capable of controlling projection illuminance.

BACKGROUND ART

Recently, because of spread of a DVD or starting of digital high-vision broadcast, environment for entertaining high image quality video contents at home has been prepared. Therefore, large displays are rapidly in increasing demand. In particular, a projection display apparatus represented by a liquid crystal projector is more inexpensive and has a larger display size than other systems such as a plasma display panel (PDP), so that a user can enjoy video. Accordingly, this projection display apparatus has come into wide use as a home theater system. To obtain high image quality of the projection display apparatus, a method for performing high dynamic ranges by controlling amount of light of a lamp in response to brightness of the image is invented (See for example, Unexamined Japanese Patent Publication No. 2001-100699).

Figure 13:
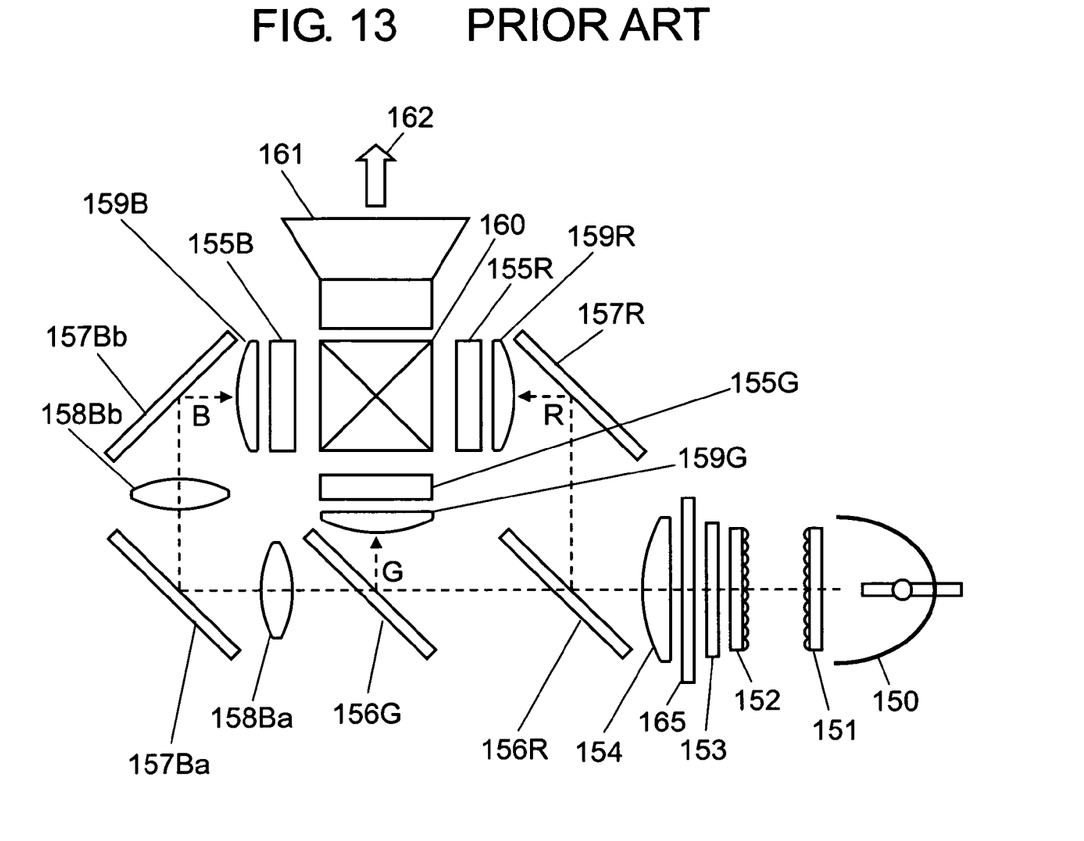
FIG. 13 is a conventional optical layout of a liquid crystal projector.

FIG. 13 is a top view showing an optical layout of a conventional liquid crystal projector.

Light emitted from lamp 150 of a light source is divided into a plurality of partial luminous fluxes by first lens array 151, and enters into polarization change element 153 via second lens array 152. Each partial luminous flux is made its polarization direction arranged, and becomes linear polarization. Then it is transmitted through diaphragm mechanism 165, and enters superimpose lens 154.

Dichroic mirror 156R reflects only red light, and lets other light pass. Dichroic mirror 156G reflects only green light, and lets other light pass.

Among light emitted from superimpose lens 154, red light "R" is reflected and separated at dichroic mirror 156R. Among light transmitted through dichroic mirror 156R, green light "G" is reflected and separated at dichroic mirror 156G, so that blue light "B" is transmitted.

Red light is reflected at total reflection mirror 157R, transmitted through field lens 159R and reaches liquid crystal panel 155R.

Green light "G" is transmitted through field lens 159G and reaches liquid crystal panel 155G.

Blue light "B" is transmitted through relay lens 158Ba, reflected at total reflection mirror 157Ba and transmitted through relay lens 158Bb. After that, blue light "B" is reflected at total reflection mirror 157Bb, transmitted through field lens 159B and reaches liquid crystal panel 155B. Liquid crystal panels 155R, 155G and 155B work as a kind of optical modulators.

Three color lights transmitted through liquid crystal panels 155R, 155G and 155B are superimposed at cross prism 160, and projected via projection lens 161.

Arrow 162 denotes a direction in which the superimposed light is projected.

Figure 14:
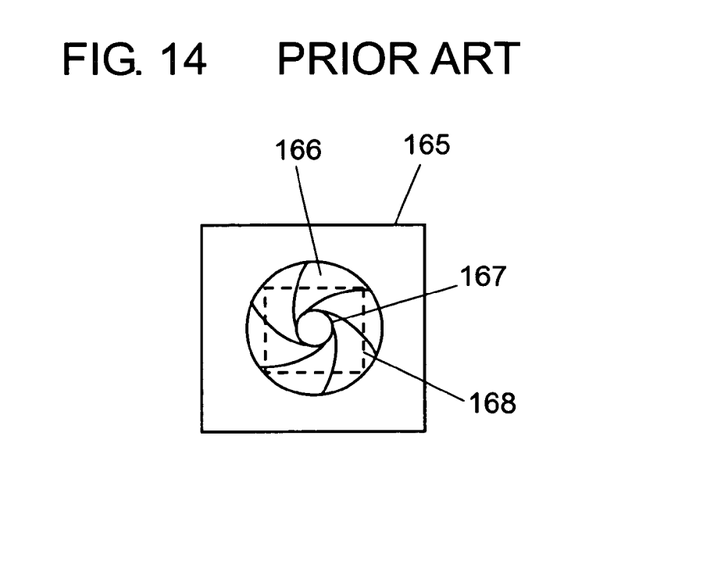
FIG. 14 is a conventional diaphragm mechanism.

FIG. 14 shows general diaphragm mechanism 165.

A luminous flux emitted from the lamp passes through part 168 where the luminous flux passes, and passes through opening 167 formed by diaphragm blade 166.

Diaphragm mechanism 165 is formed of a plurality of diaphragm blades 166, and an amount of light of lamp 150 is controlled by changing an area of opening 167 continuously using driving means such as a motor (not shown). A motor is driven in synchronization with brightness of an image in such a manner that the area of opening 167 becomes large when the image is bright and the area of opening 167 becomes small when the image is dark. Thus, high dynamic ranges can be performed.

The conventional projection display apparatus discussed above needs a space for storing the diaphragm blades. The space is larger than a section up which a luminous flux from the lamp takes, thereby making the apparatus difficult in downsizing. In addition, because many diaphragm blades are needed, components increase in number, so that the apparatus tends to be expensive. A phase plate or a polarizing plate can be utilized instead of the diaphragm blade, however, it is also expensive, so that it is not practical.

SUMMARY OF THE INVENTION

A projection display apparatus of the present invention for expanding and projecting an image, which is formed by an optical modulator, using a projection lens is constituted as follows:

A light source illuminates the optical modulator. A first lens array divides light emitted from the light source into a plurality of partial luminous fluxes. A second lens array superimposes the plurality of partial luminous fluxes emitted from the first lens array onto the optical modulator. A diaphragm mechanism is disposed between the light source and the optical modulator, and controls an amount of light from the light source.

A traveling direction of the light emitted from the light source is defined as a Z-axis, a direction perpendicular to the Z-axis is defined as an X-axis, and a direction perpendicular to a plane formed by the Z-axis and the X-axis is defined as a Y-axis. An area of an opening of the diaphragm mechanism changes in a direction of the X-axis or the Y-axis.

DETAILED DESCRIPTION OF THE PREFERRED EMBODIMENT

Exemplary embodiments of the present invention are demonstrated hereinafter with reference to the accompanying drawings.

Figure 1:
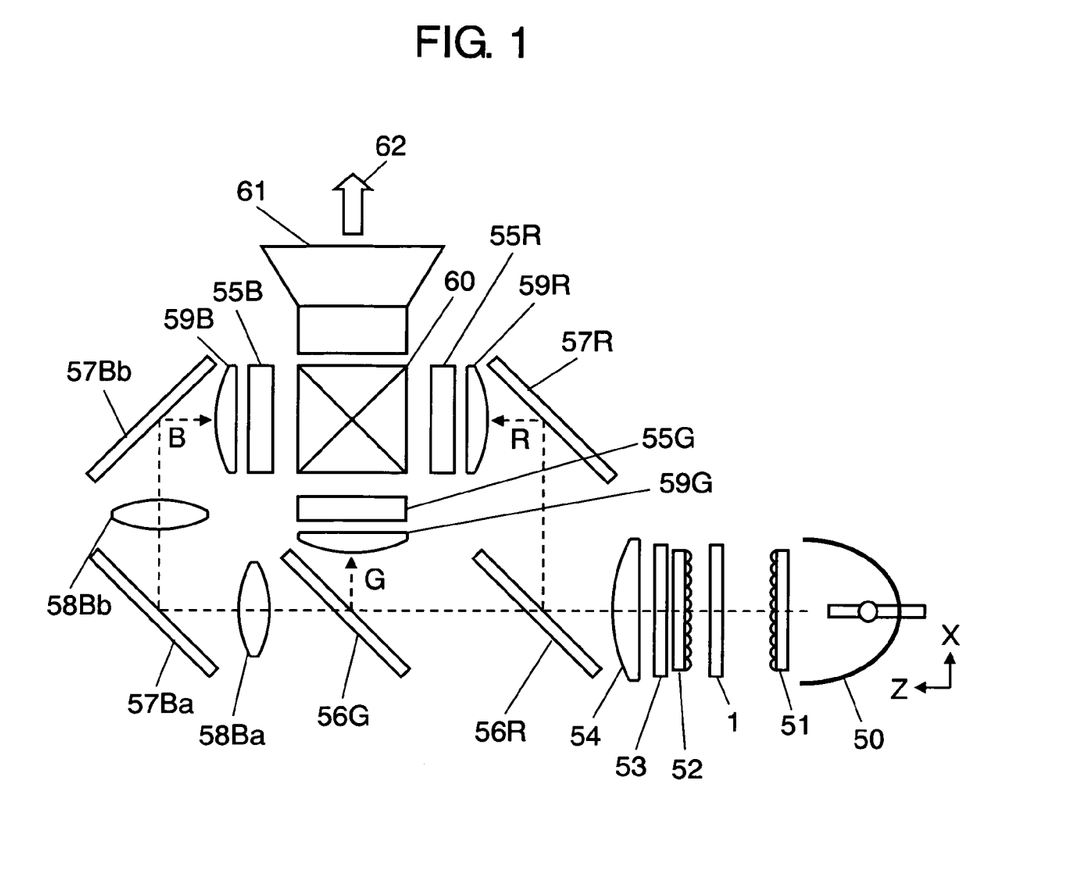
FIG. 1 is an optical layout of a liquid crystal projector in accordance with an exemplary embodiment of the present invention.

FIG. 1 is a top view showing an optical layout of a liquid crystal projector in accordance with the exemplary embodiment of the present invention.

Light emitted from lamp 50 of a light source is divided into a plurality of partial luminous fluxes by first lens array 51, and enters into polarization change element 53 via second lens array 52. Each partial luminous flux is made its polarization direction arranged, and becomes linear polarization. Then it is transmitted through diaphragm mechanism 65, and enters superimpose lens 54.

Dichroic mirror 56R reflects only red light "R", and lets other light pass. Dichroic mirror 56G reflects only green light "G", and lets other light pass.

Among light emitted from superimpose lens 54, red light "R" is reflected and separated at dichroic mirror 56R. Among light transmitted through dichroic mirror 56R, green light "G" is reflected and separated at dichroic mirror 56G, so that blue light "B" is transmitted.

Red light "R" is reflected at total reflection mirror 57R, transmitted through field lens 59R and reaches liquid crystal panel 55R.

Green light "G" is transmitted through field lens 59G and reaches liquid crystal panel 55G.

Blue light "B" is transmitted through relay lens 58Ba, reflected at total reflection mirror 57Ba and transmitted through relay lens 58Bb. After that, blue light "B" is reflected at total reflection mirror 57Bb, transmitted through field lens 59B and reaches liquid crystal panel 55B. Liquid crystal panels 55R, 55G and 55B work as a kind of optical modulators.

Three color lights transmitted through liquid crystal panels 55R, 55G and 55B are superimposed at cross prism 60, and projected via projection lens 61.

Arrow 62 denotes a direction in which the superimposed light is projected.

Diaphragm mechanism 1 is disposed between first lens array 51 and second lens array 52. A traveling direction of the light emitted from lamp 50 is in a Z-axis. A horizontal direction of diaphragm mechanism 1 is along an X-axis.

Figure 2A:
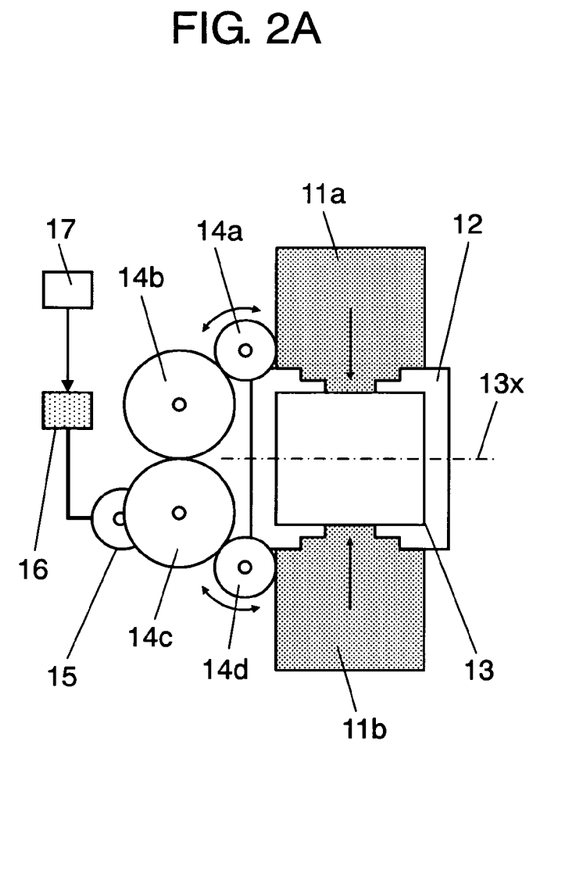
FIGS. 2A and 2B show a diaphragm mechanism in accordance with the exemplary embodiment of the present invention.
Figure 2B:
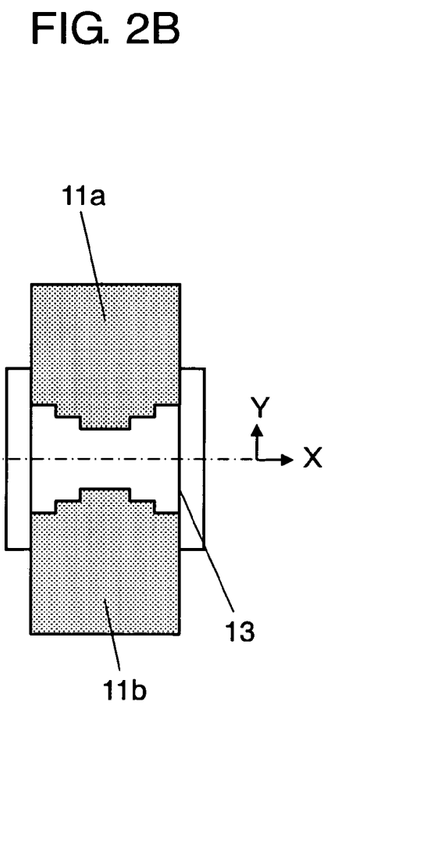

FIGS. 2A and 2B are front views of diaphragm mechanism 1 shown from a side of lamp 50 along the Z-axis. The X-axis denotes the horizontal direction, and a Y-axis denotes a vertical direction.

Diaphragm wings 11a and 11b are held by frame 12, thereby forming opening 13.

FIG. 2A shows a state where a diaphragm is opened.

FIG. 2B shows a state where a diaphragm is closed.

Diaphragm blades 11a and 11b are linked and moved with gears 14a, 14b, 14c and 14d. Gear 14c is coupled with motor 15. By driving motor 15, diaphragm blades 11a and 11b move vertically by the same distance. At that time, an area of opening 13 is changed with keeping vertically symmetric shape with reference to a height of a center position (13x in FIG. 2A). Brightness detecting apparatus 17 detects brightness of an image to be projected. Brightness detecting apparatus 17 detects luminance of the frame from an input video signal, calculates an average value of the luminance of the frame, and sends a control signal of a rotation angle of motor 15 to motor controller 16.

Motor controller 16 drives motor 15 based on the received control signal, and moves diaphragm blades to certain positions. Diaphragm blades 11a and 11b are driven by motor 15 in such a manner that an area of opening 13 becomes large when a bright image is projected and an area of opening 13 becomes small when a dark image is projected. Thus, high dynamic ranges can be performed.

Figure 3:
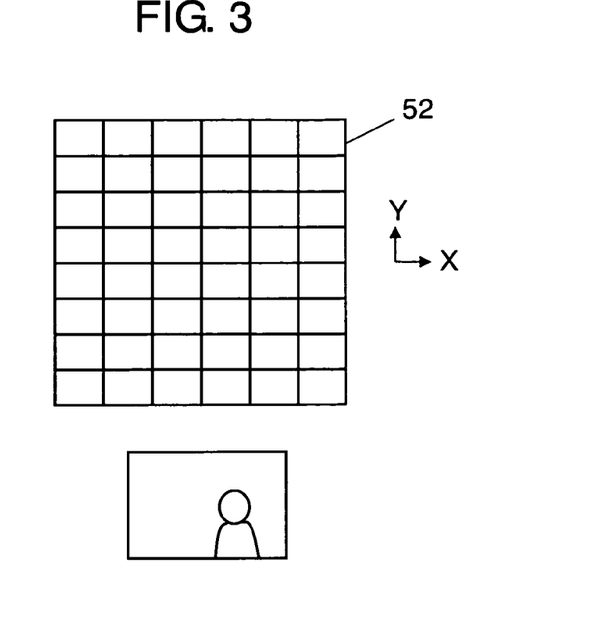
FIG. 3 shows a second lens array and a projected image.

FIG. 3 shows a front view of second lens array 52 and a projected image.

Second lens array 52 is divided into 8 cells in length and 6 cells in width, and each cell is structured by a lens. First lens array 51 is also divided into the same number of cells, namely structured by a plurality of lenses. The cell is in a horizontally long rectangular shape, and substantially similar to the projected image in shape. FIG. 3 shows a state where second lens array 52 is not shielded with diaphragm mechanism 1, so that a bright and uniform projected image can be obtained.

Figure 4:
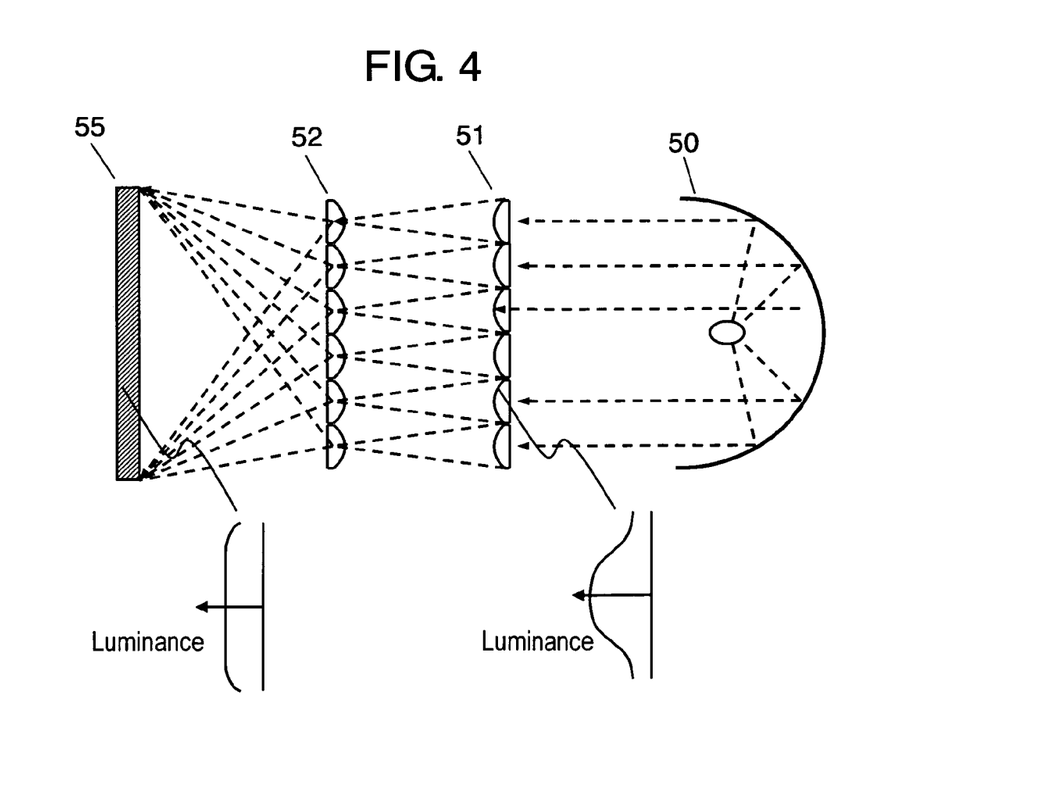
FIG. 4 is a schematic view showing an integrator illumination system formed of a first lens array and the second lens array.

FIG. 4 is a schematic view showing an integrator illumination system formed of first lens array 51 and second lens array 52.

To understand the drawings easily, a path of red color "R" from lamp 50 to liquid crystal panel 55 in FIG. 1 is represented in FIG. 4. Diaphragm mechanism 1, polarization change element 53, superimpose lens 54, dichroic mirror 56 (R), total reflection mirror 57 (R) are omitted in FIG. 4.

According to distribution of the light emitted from lamp 50 having a reflecting mirror, a periphery is dark in front of first lens array 51 as shown in FIG. 4. In this case, when liquid crystal panel 55 is illuminated, a periphery of a projected display also becomes extremely dark. To deal with this, the integrator illumination system shown in FIG. 4 is adopted, so that illuminance of the projected display improves in uniformity. The integrator is formed of a plurality of lenses.

As shown in FIG. 4, first lens array 51 divides the light emitted from reflecting mirror 50 into a plurality of partial luminous fluxes, and forms an image of the light source in response to intensity of this emitted light distribution on each lens of second lens array 52. A lot of light sources of the lenses are superimposed and emitted to a whole surface of liquid crystal panel 55, so that illuminance on the liquid crystal panel improves in uniformity.

In FIG. 4, dotted lines and arrows respectively denote lights and directions of the lights schematically.

Next, relation between a shape of the diaphragm blade and the projected image is described hereinafter.

Figure 5A:
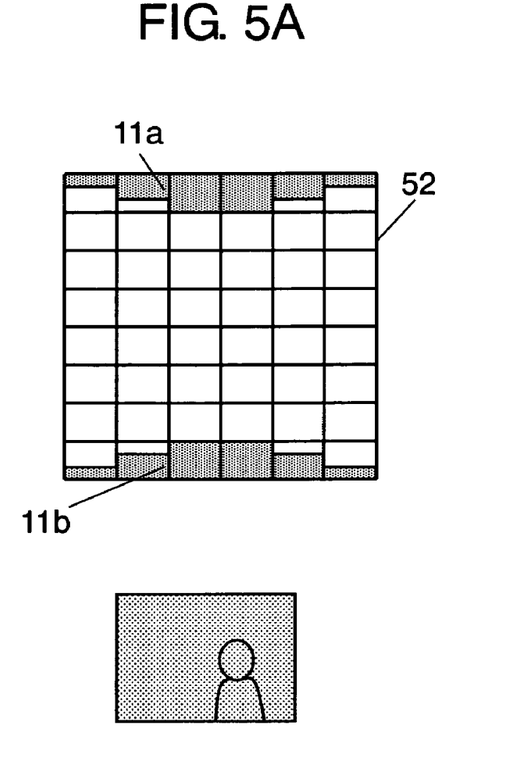
FIGS. 5A and 5B show light-shielding states of the second lens arrays and projected images in accordance with the exemplary embodiment of the present invention.
Figure 5B:
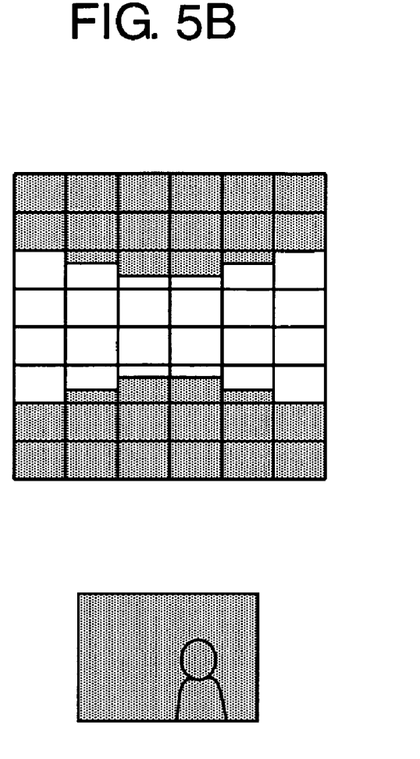

FIGS. 5A and 5B show light-shielding states of second lens array 52 by diaphragm mechanism 1 and projected images at that time.

FIG. 5A shows a state where the diaphragm value is small, and FIG. 5B shows a state where the diaphragm value is large.

As for shapes of diaphragm blades 11a and 11b, end positions, which correspond to respective cells, of diaphragm blades 11a and 11b are different in such a manner that second lens array 52 has different light-shielded areas of the cells which are light-shielded by diaphragm blades 11a and 11b.

Figure 6:
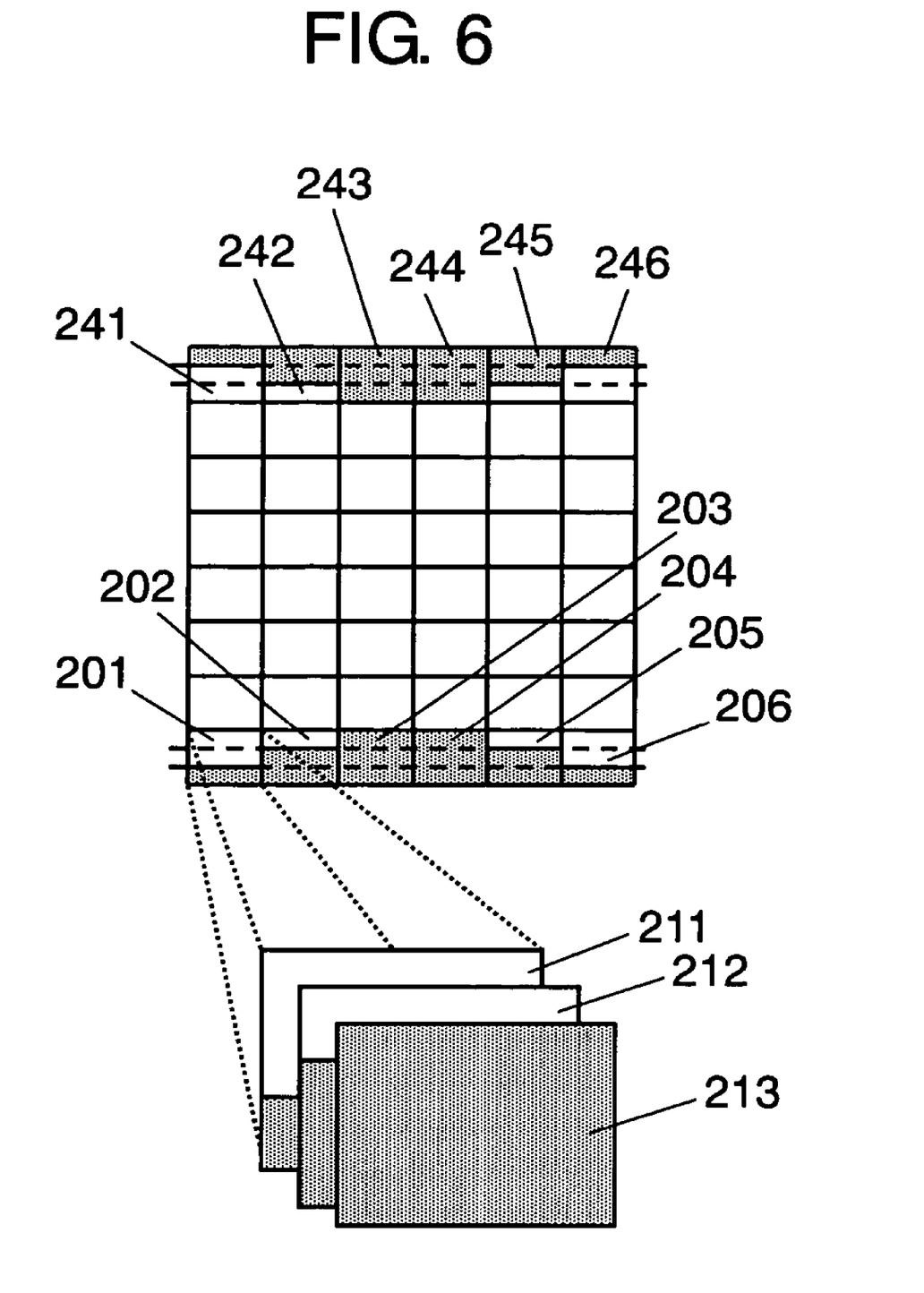
FIG. 6 shows relation between a light-shielding state of each lens cell of the second lens array of the diaphragm mechanism and a projected image.

FIG. 6 shows relation between a light-shielding state of each lens cell of second lens array 52 by diaphragm mechanism 1 and a projected image.

A plurality of images of the light source formed on each lens cell on second lens array 52 are superimposed and emitted to liquid crystal panel 55, so that illuminance on the liquid crystal panel improves in uniformity.

According to an example of FIG. 6, illuminance on the liquid crystal panel becomes uniform as described hereinafter.

Lens cell 201 illuminates ⅔ of an upper side of the liquid crystal panel, and ⅓ of a lower side thereof is light-shielded. Lens cell 202 illuminates ⅓ of an upper side of the liquid crystal panel, and ⅔ of a lower side thereof is light-shielded. Whole lens cell 203 is light-shielded.

Rectangles 211, 212 and 213 corresponding to liquid crystal panels schematically show states where the liquid crystal panel is illuminated by lens cells 201, 202 and 203. Therefore, rectangles 211, 212 and 213 also schematically show projected images.

Similarly lens cell 206 illuminates ⅔ of an upper side of the liquid crystal panel, and ⅓ of a lower side thereof is light-shielded. Lens cell 205 illuminates ⅓ of an upper side of the liquid crystal panel, and ⅔ of a lower side thereof is light-shielded. Whole lens cell 204 is light-shielded.

Accordingly, the whole liquid crystal panel is illuminated by combination of lens cell 201 and lens cell 245. Similarly, the whole liquid crystal panel is illuminated by combination of lens cell 202 and lens cell 246. The liquid crystal panel is not illuminated by combination of lens cell 203 and lens cell 204.

Similarly, the whole liquid crystal panel is illuminated by combination of lens cell 241 and lens cell 205. Similarly, the whole liquid crystal panel is illuminated by combination of lens cell 242 and lens cell 206. The liquid crystal panel is not illuminated by combination of lens cell 243 and lens cell 244.

Illuminance decreases uniformly by amount of shielded light, so that liquid crystal panel 55 is illuminated uniformly.

In addition, a position of a border between a light-shielded dark part and a bright part differs with cells, so that a border between brightness and darkness of each cell is not conspicuous at a projected image.

As discussed above, the case where a pair of diaphragm blades 11a and 11b exist as shown in FIG. 5 is described by using FIG. 6. As is clear from the discussion mentioned above, even when a diaphragm mechanism having only one of diaphragm blades 11a and 11b is used, illuminance decreases uniformly by amount of shielded light, so that liquid crystal panel 55 is illuminated uniformly. In this case, a border between brightness and darkness of each cell is also not conspicuous at a projected image.

Besides, in a case where diaphragm mechanism 1 is positioned between first lens array 51 and light source 50, if second lens array 52 is exchanged to first lens array 51 in the above discussion, the same effect can be obtained. Accordingly, diaphragm mechanism 1 may be placed between first lens array 51 and light source 50.

Further, in FIG. 5B showing that the diaphragm value is large, as discussed in FIG. 6, illuminance decreases uniformly by amount of shielded light, so that liquid crystal panel 55 is illuminated uniformly. Therefore, illuminance more decreases uniformly than that of FIG. 5A without deteriorating quality of a projected image.

Figure 7A:
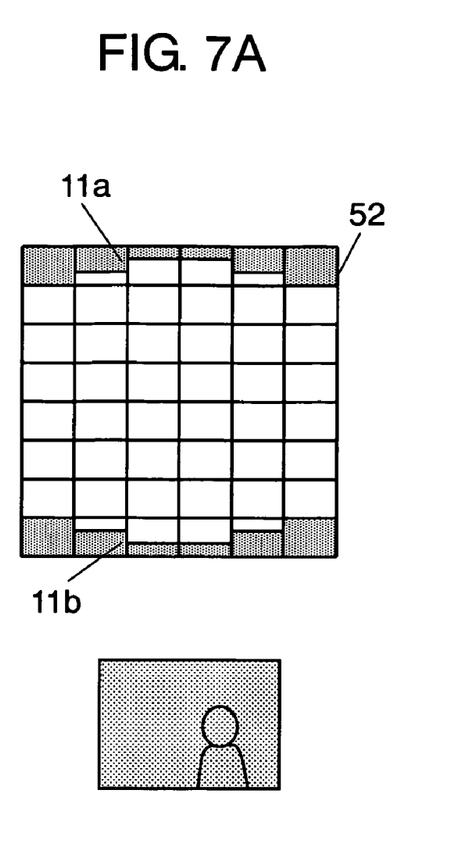
FIGS. 7A and 7B show light-shielding states of second lens arrays by diaphragm blades having different shapes and projected images in accordance with an exemplary embodiment of the present invention.

FIG. 7A shows a light-shielding state of second lens array 52 by diaphragm mechanism 1 having a blade shape different from that of FIG. 5 and its projected image.

Even though the shape is different, as discussed in FIG. 6, liquid crystal panel 55 is illuminated uniformly. Accordingly illuminance decreases uniformly in the projected plane by amount of shielded light.

Figure 7B:
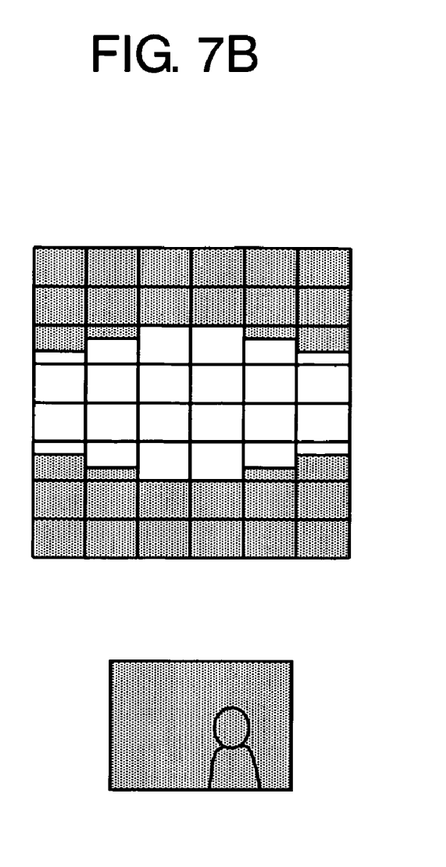

Still further, in FIG. 7B showing that the diaphragm value is large, illuminance more decreases uniformly than that of FIG. 7A without deteriorating quality of a projected image.

Figure 8A:
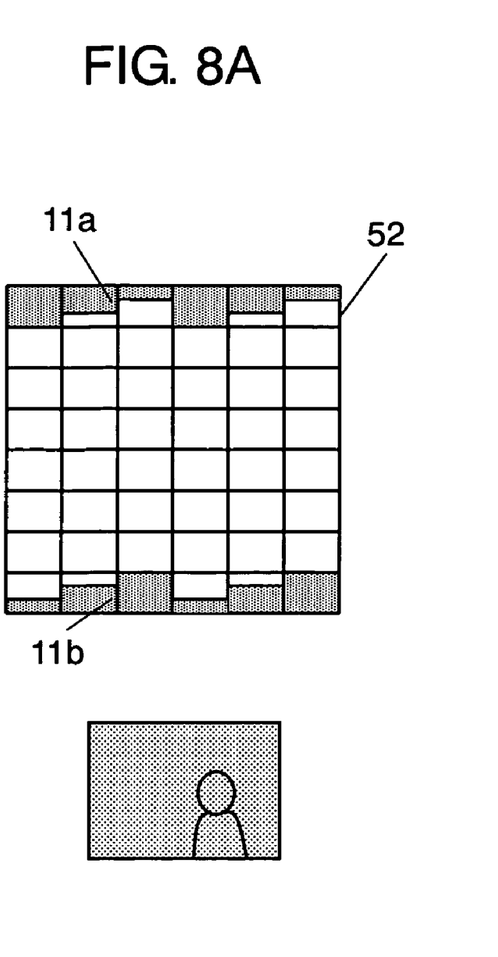
FIGS. 8A and 8B show light-shielding states of second lens arrays formed of diaphragm blades having different shapes and projected images in accordance with an exemplary embodiment of the present invention.

FIG. 8A shows a light-shielding state of second lens array 52 by diaphragm mechanism 1 having a wing shape different from that of FIGS. 5A, 5B, 7A and 7B and its projected image.

Similarly even though the shape is different, as discussed in FIG. 6, liquid crystal panel 55 is illuminated uniformly. Accordingly illuminance decreases uniformly in the projected plane by amount of shielded light.

Figure 8B:
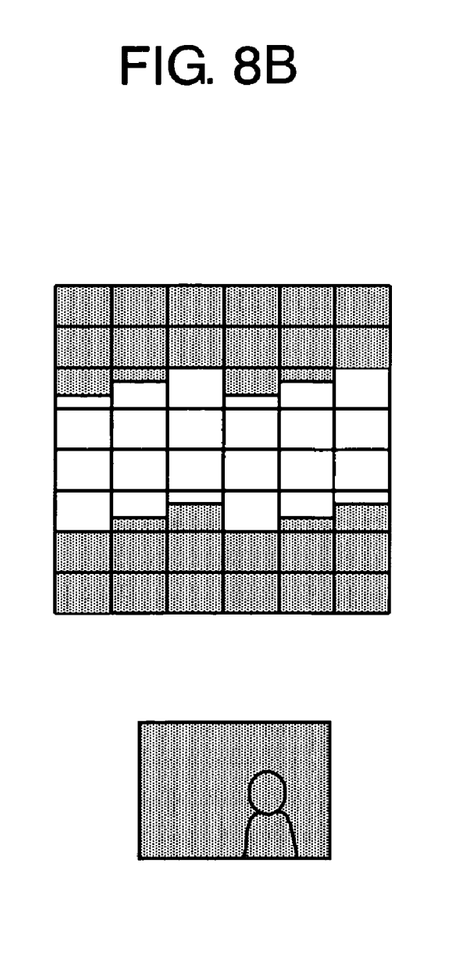

Yet further, in FIG. 8B showing that the diaphragm value is large, illuminance more decreases uniformly than that of FIG. 8A without deteriorating quality of a projected image.

In a case of the diaphragm wing whose shape is shown in FIGS. 5A, 5B, 7A, 7B, 8A and 8B, when the diaphragm value changes, liquid crystal panel 55 may be illuminated non-uniformly. However, even in that case, a projected plane is illuminated substantially uniformly.

Furthermore, even in a case where the liquid crystal panel is illuminated substantially uniformly, a position of a border between a light-shielded dark part and a bright part differs with cells, so that a border between brightness and darkness of each cell is not conspicuous at a projected image.

Next, a case where light-shielded areas of respective cells become equal is described hereinafter.

Figure 9A:
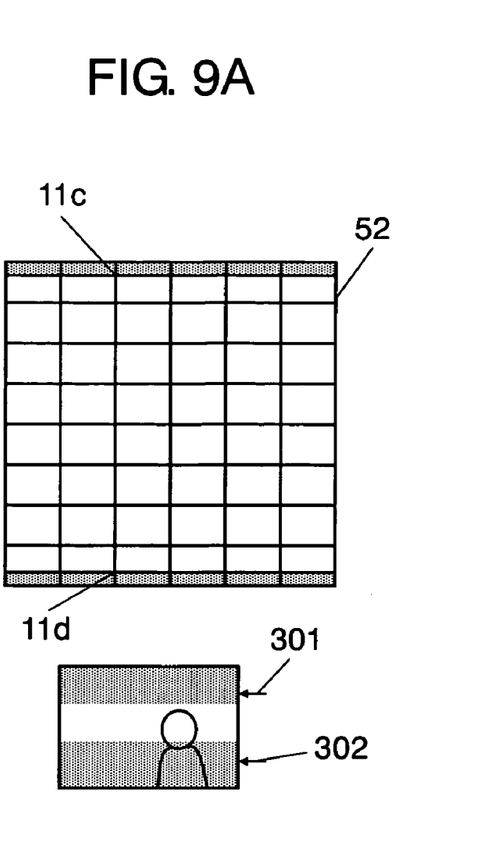
FIGS. 9A and 9B show light-shielding states of second lens arrays and projected images.
Figure 9B:
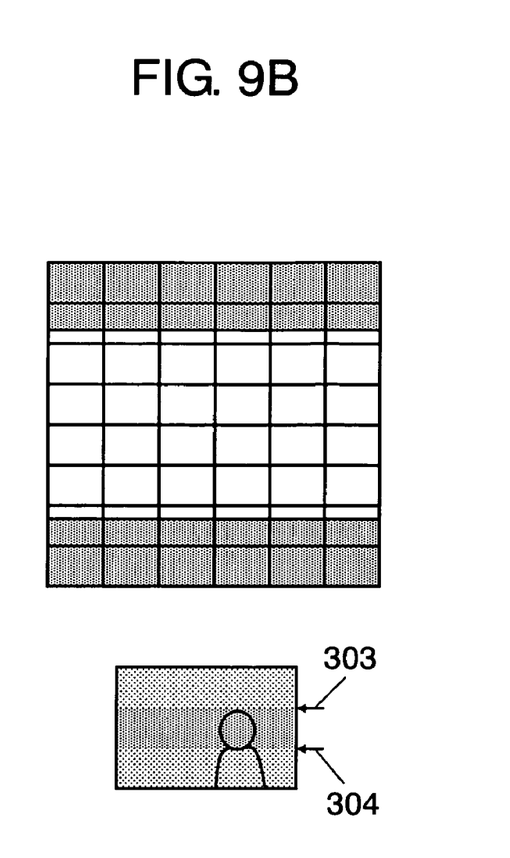

FIGS. 9A and 9B are front views showing light-shielded second lens arrays and their projected images. FIG. 9A shows a state where the diaphragm value is small, and FIG. 9B shows a state where the diaphragm value is large.

In FIGS. 9A and 9B, diaphragm blades 11c and 11d are formed as a straight line. In this case, areas to be light-shielded by respective cells of the second lens arrays becomes equal one another, so that borders between brightness and darkness of respective cells correspond with one another at a projected image formed by superimposing. Therefore, non-uniformity of brightness is generated at positions indicated by arrows 301, 302, 303 and 304 in FIGS. 9A and 9B. Particularly, for example, when the diaphragm value changes from a state of FIG. 9A to a state of FIG. 9B, a position having non-uniformity of brightness of the projected image moves in response to positions of diaphragm blades 11c and 11d. Therefore, quality of the projected image deteriorates remarkably.

As shown in FIGS. 5A, 5B, 7A, 7B, 8A and 8B, diaphragm blades 11a and 11b is formed in such a manner that the second lens array has different light-shielded areas of the cells which are light-shielded by diaphragm blades 11a and 11b. Thus, even when the diaphragm value is changed, illuminance changes substantially uniformly at the projected plane. Accordingly, even when brightness of the projected image changes continuously, high dynamic ranges with natural images can be obtained.

A shape of diaphragm blade is not limited to the shape shown in FIGS. 5A, 5B, 7A, 7B, 8A and 8B. Another shape is acceptable, if brightness of the projected image changes continuously and uniformly according to changing of the light-shielded area of the diaphragm blade.

Figure 10A:
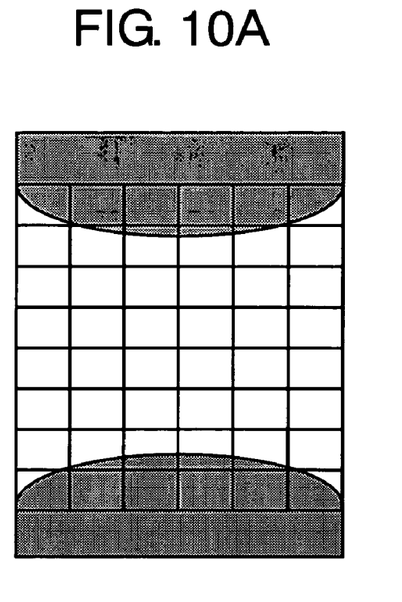
FIGS. 10A, 10B and 10C show light-shielding states of second lens arrays.
Figure 10B:
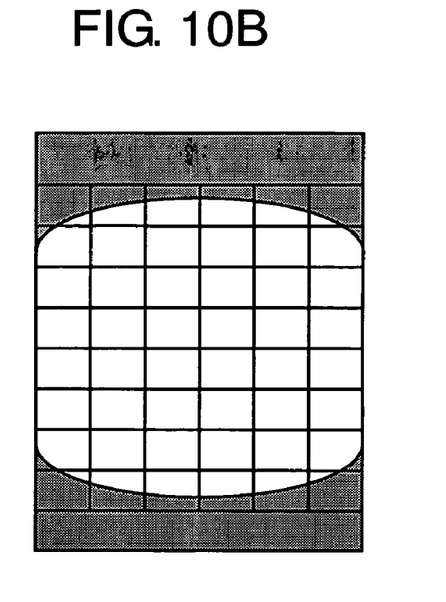
Figure 10C:
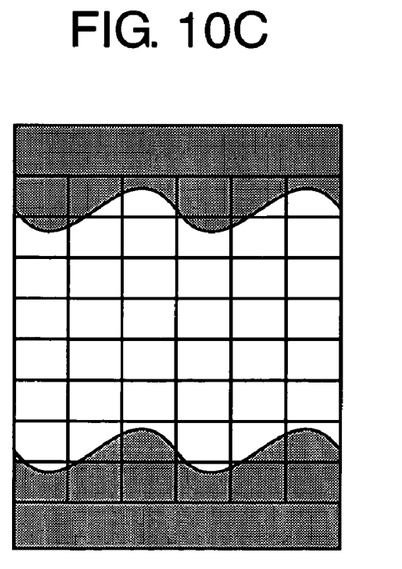

In addition, in the examples of FIGS. 5A, 5B, 7A, 7B, 8A and 8B, a shape of diaphragm blades 11a and 11b is a stepwise shape formed by straight lines. However, for example, a shape of the diaphragm blade may be formed by a smooth curve shown in FIGS. 10A, 10B and 10C in response to the shape of the diaphragm blade of FIGS. 5A, 5B, 7A, 7B, 8A and 8B. If a shape of the diaphragm blade is formed in such a manner that light-shielded areas of the respective cells include different area values, and illuminance can be reduced substantially uniformly at the projected plane, the diaphragm blade may be formed using the shape combined by these curves.

Besides, according to FIGS. 5A, 5B, 7A, 7B, 8A and 8B, diaphragm blades 11a and 11b are formed in such a manner that opening 13 shows a vertically and horizontally symmetric shape. However, opening 13 may show a vertically and horizontally asymmetric shape. In addition, as mentioned above, diaphragm blades may be formed of one piece. However, a reflection wavelength depends on an incident angle at dichroic mirrors 56G and 56R, so that non-uniformly of color is easy to occur slightly at the projected image when opening 13 has a vertically and horizontally asymmetric shape. Therefore, a vertically and horizontally symmetric shape or a point symmetric shape with respect to a center of the opening is preferable.

Further, according to the present embodiment, a case where diaphragm mechanism 1 is disposed between first lens array 51 and second lens array 52 is described.

However, in a case where diaphragm mechanism 1 is positioned between first lens array 51 and light source 50, if second lens array 52 is exchanged to first lens array 51 in the above discussion, the same effect can be obtained. Accordingly, diaphragm mechanism 1 may be placed between first lens array 51 and light source 50.

In addition, if the same effect can be obtained, a pair of diaphragm mechanisms or a plurality of diaphragm mechanisms may be positioned at any one of positions of an optical path between lamp 50 and liquid crystal panel 55R, 55G or 55B.

Next, a case of using another diaphragm mechanism of the present embodiment is described hereinafter.

Figure 11A:
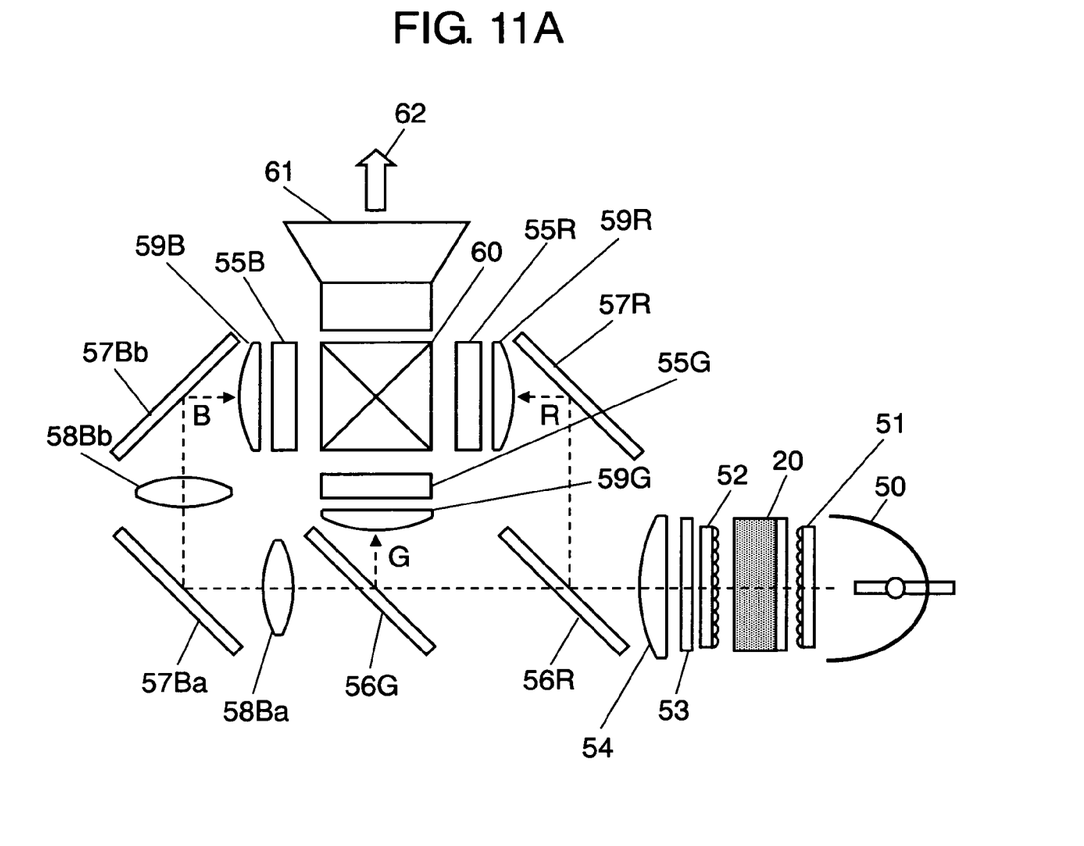
FIG. 11A is an optical layout of a liquid crystal projector using another diaphragm mechanism in accordance with an exemplary embodiment of the present invention.

FIG. 11A is a top view showing an optical layout of a liquid crystal projector in this case.

According to FIG. 11A, diaphragm mechanism 20 is disposed between first lens array 51 and second lens array 52 instead of diaphragm mechanism 1 shown in FIG. 1 discussed above.

Excluding this point, in the liquid crystal projector shown in FIG. 11A, the elements similar to those shown in FIG. 1 have the same reference marks and their operation are same.

Figure 11B:
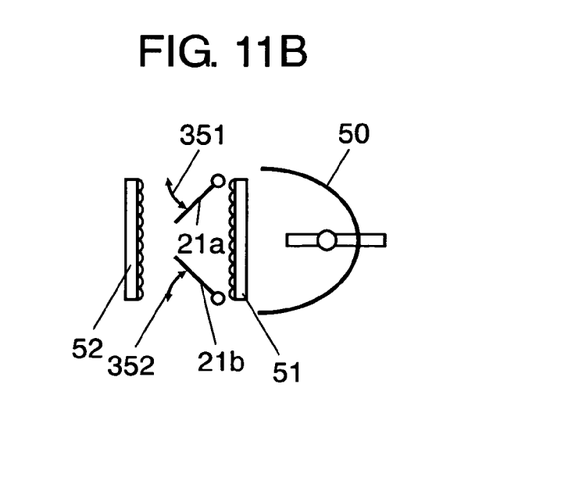
FIG. 11B is a sectional view showing a neighborhood of the diaphragm mechanism in accordance with the exemplary embodiment of the present invention.

FIG. 11B is a sectional view showing a neighborhood of diaphragm mechanism 20.

Figure 12:
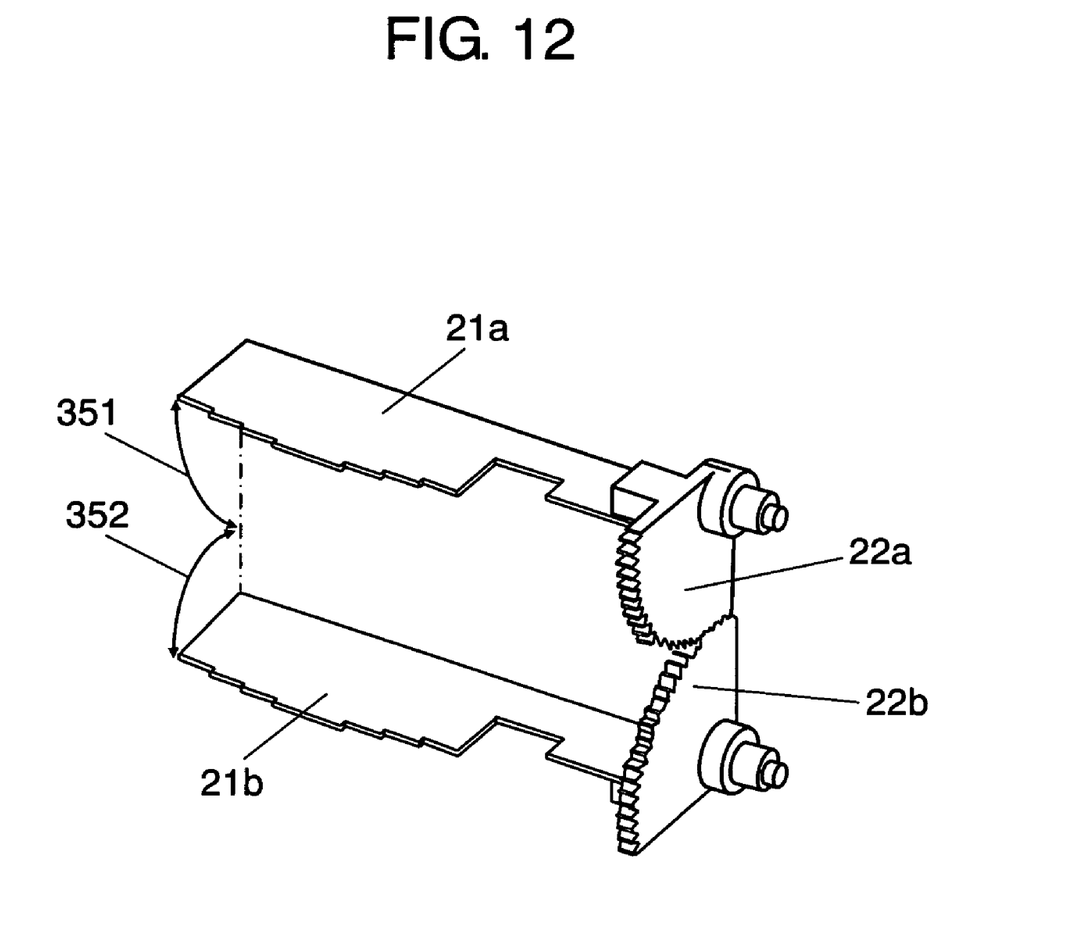
FIG. 12 is a perspective view of the diaphragm mechanism in accordance with the exemplary embodiment of the present invention.

FIG. 12 is a perspective view of diaphragm mechanism 20.

In FIGS. 11B and 12, diaphragm blades 21a and 21b are coupled with each other by gears 22a and 22b, linked with a motor (not shown) and move. A gear ratio of gear 22a to gear 22b is set 1 to 1. Diaphragm blades 21a and 21b move vertically and symmetrically each other as shown at arrows 351 and 352 respectively.

FIG. 12 shows a state where a diaphragm is opened.

Diaphragm blades 21a and 21b perform an opening and closing operation in directions of arrows 351 and 352 shown in FIG. 12, so that a part of luminous flux emitted from lamp 50 is shielded.

As diaphragm blades 11a and 11b shown in FIG. 4, diaphragm blades 21a and 21b each is formed as a stepwise shape in such a manner that a cell of a second lens array has different light-shielded area from another cell. Using this structure, as this embodiment 1, brightness on a projected plane can be controlled uniformly without deteriorating quality of a projected image.

The diaphragm mechanism discussed before needs a space for storing the diaphragm blade outside the optical path, so that the diaphragm mechanism becomes large. On the contrary, according to a method discussed here, diaphragm blades 21a and 21b can be stored between the first lens array and the second lens array, so that it is effective for saving spaces.

Material having high reflectivity such as bright aluminum or material whose surface is plated with a material such as chrome having high reflectivity is preferably used at diaphragm blades 11 and 21. In this case, diaphragm blades 11 and 21 reflect light from lamp 50. Accordingly, heat-transfer to a driving section of diaphragm mechanism 1 or diaphragm mechanism 20 can be prevented. As a result, temperature-rise of the diaphragm mechanism and the driving section can be suppressed.

A magnet used in the motor for driving diaphragm mechanism 1 or diaphragm mechanism 20 is demagnetized at a high temperature and its characteristics deteriorates. Therefore, by reducing a driving temperature of the driving section, stable driving characteristics of the motor can be obtained. Furthermore, by reducing the driving temperature, sufficient driving characteristics can be obtained even in a case of a motor using an inexpensive magnet, thereby making the apparatus at a low cost.

In addition, a voice coil motor is preferably used as the motor for driving diaphragm mechanism 1 or diaphragm mechanism 20. The voice coil motor can work at a speed of response of 1/30 msec sufficiently, and thereby following luminance fluctuation of a moving image. Besides, the voice coil motor can control a stop position of the diaphragm blade without steps. Therefore, high dynamic ranges can be performed without deteriorating quality of a moving image.

According to the present embodiment, a liquid crystal projector is discussed. However, even though a projector using a micro mirror, if it is a projection display apparatus adopting a method using a lens array to uniform a luminous flux from a lump, the present invention can be adapted.

INDUSTRIAL APPLICABILITY

According to the present invention, using a simple diaphragm mechanism formed by a pair of diaphragm blades, a compact and low-cost projection display apparatus can be obtained. Furthermore, the projection display apparatus of the present invention can obtain high dynamic ranges. Therefore, the projection display apparatus of the present invention is useful as a projection display apparatus capable of controlling projection illuminance.

The invention claimed is:

1. A projection display apparatus for expanding and projecting an image, which is formed by an optical modulator, using a projection lens comprising:

a light source for illuminating the optical modulator;

a first lens array for dividing light emitted from the light source into a plurality of partial luminous flux;

a second lens array for superimposing the plurality of partial luminous fluxes emitted from the first lens array onto the optical modulator; and a diaphragm mechanism, which is disposed between the light source and the optical modulator, for controlling an amount of light from the light source, wherein a traveling direction of the light emitted from the light source is defined as a Z-axis, a direction perpendicular to the Z-axis is defined as an X-axis, and a direction perpendicular to a plane formed by the Z-axis and the X-axis is defined as a Y-axis, wherein an area of an opening of the diaphragm mechanism changes in a direction of the X-axis or the Y-axis, wherein the diaphragm mechanism has a diaphragm blade or a pair of diaphragm blades both of which are positioned in the Y-axis direction with an interval, wherein areas of respective plural lenses included in the first lens array or the second lens array, which are light-shielded by a side-portion of the opening of the diaphragm blade or each of the pair of diaphragm blades, include different light-shielded areas, wherein the diaphragm blade or each of the pair of diaphragm blades has a shape in such a manner that illuminance is substantially uniformly changed at a plane where the light emitted from the light source is projected while the area of the opening of the diaphragm mechanism changes wherein the image formed by the optical modulator has a rectangular shape, and a short side direction of the rectangular shape of the image corresponds to the Y-axis, and the side-portion of the opening of the diaphragm blade or the each of the pair of diaphragm blades has a stepwise shape and a width along an X-axis light-shielded by each step of the stepwise shape corresponds to a width along the X-axis of respective one of the respective plural lenses.

2. The projection display apparatus of claim 1, wherein the diaphragm mechanism for controlling the amount of light is disposed between the first lens array and the second lens array.

3. The projection display apparatus of claim 1, wherein the area of the opening of the diaphragm mechanism changes in a direction of the Y-axis.

4. The projection display apparatus of claim 1, wherein a center of the opening is located at a same position while a diaphragm value changes.

5. The projection display apparatus of claim 4, wherein the opening has a point symmetric shape with respect to the center of the opening.

6. The projection display apparatus of claim 1, wherein the diaphragm blade or each of the pair of diaphragm blades rotates about an end of a side.

7. The projection display apparatus of claim 1, wherein the diaphragm blade or each of the pair of diaphragm blades is made of material having high reflectivity.

8. The projection display apparatus of claim 1, further comprising:

a detector for detecting luminance of an image; and a driving section for driving the diaphragm blade or each of the pair of diaphragm blades, wherein the diaphragm blade or each of the pair of diaphragm blades is driven based on the detected luminance of the image in such a manner that a position of the diaphragm blade or a position of each of the pair of diaphragm blades is determined.

9. The projection display apparatus of claim 8, wherein a voice coil motor is used as the driving section.

10. The projection display apparatus of claim 1, wherein the stepwise shapes of one and the other of the pair of diaphragm blades are symmetrical about the X-axis.

11. The projection display apparatus of claim 1, wherein the stepwise is formed by straight lines.

12. The projection display apparatus of claim 10, wherein the stepwise is formed by straight lines.

* * * * *

UNITED STATES PATENT AND TRADEMARK OFFICE
CERTIFICATE OF CORRECTION

PATENT NO. : 7,185,990 B2
APPLICATION NO. : 10/537979
DATED : March 6, 2007
INVENTOR(S) : Akira Koga et al.

Page 1 of 1

It is certified that error appears in the above-identified patent and that said Letters Patent is hereby corrected as shown below:

Title Page,
Page 2, Item (56) References Cited, FOREIGN PATENT DOCUMENTS
Change "JP   2003-107396 A     4/1993"
to -- JP    2003-107396 A    4/2003 --

Signed and Sealed this

Third Day of July, 2007

JON W. DUDAS
*Director of the United States Patent and Trademark Office*